United States Patent
Nitta

(10) Patent No.: US 10,562,785 B2
(45) Date of Patent: Feb. 18, 2020

(54) FLUORESCENT MATERIAL, SCINTILLATOR, SCINTILLATOR ARRAY, AND RADIATION DETECTOR

(71) Applicant: HITACHI METALS, LTD., Minako-ku, Tokyo (JP)

(72) Inventor: Hideo Nitta, Osaka (JP)

(73) Assignee: HITACHI METALS, LTD., Tokyo (JP)

(*) Notice: Subject to any disclaimer, the term of this patent is extended or adjusted under 35 U.S.C. 154(b) by 0 days.

(21) Appl. No.: 15/515,165

(22) PCT Filed: Sep. 30, 2015

(86) PCT No.: PCT/JP2015/077738
§ 371 (c)(1),
(2) Date: Mar. 29, 2017

(87) PCT Pub. No.: WO2016/052616
PCT Pub. Date: Apr. 7, 2016

(65) Prior Publication Data
US 2017/0217784 A1    Aug. 3, 2017

(30) Foreign Application Priority Data
Sep. 30, 2014  (JP) .................. 2014-199755

(51) Int. Cl.
| | | |
|---|---|---|
| *G01G 15/00* | (2006.01) | |
| *G01T 1/20* | (2006.01) | |
| *G01T 1/36* | (2006.01) | |
| *G21K 4/00* | (2006.01) | |
| *C01G 15/00* | (2006.01) | |

(52) U.S. Cl.
CPC .............. *C01G 15/006* (2013.01); *G01T 1/20* (2013.01); *G01T 1/36* (2013.01); *G21K 4/00* (2013.01)

(58) Field of Classification Search
None
See application file for complete search history.

(56) References Cited

U.S. PATENT DOCUMENTS

2005/0006588 A1* 1/2005 Fuchs .................. G01T 1/2018
                                                  250/367
2008/0017802 A1   1/2008 Nakamura et al.
(Continued)

FOREIGN PATENT DOCUMENTS

| CN | 101084290 | 12/2007 |
|----|-----------|---------|
| CN | 102168307 | 8/2011 |

(Continued)

OTHER PUBLICATIONS

International Search Report for PCT/JP2015/07738 dated Dec. 15, 2015.

*Primary Examiner* — Edwin C Gunberg
(74) *Attorney, Agent, or Firm* — Nixon Peabody LLP; Jeffrey L. Costellia

(57) ABSTRACT

A fluorescent material has a composition represented by $(Gd_{1-\alpha-\beta-\gamma}R_\alpha Ce_\beta Tb_\gamma)_{3+a}(Al_{1-u-v}Ga_u Sc_v)_{5-b}O_{12}$, wherein: R is at least one of Y and Lu; a, b, α, β, γ, u and v satisfy ranges below:

$0 \leq a \leq 0.1$, $0 \leq b \leq 0.1$, $0 \leq \alpha \leq 0.8$, $0.0003 \leq \beta \leq 0.005$, $0.02 \leq \gamma \leq 0.2$, $0.27 \leq u \leq 0.75$, (Continued)

and $0 \leq v \leq 0.02$;

a relative density is 99% or more; and an effective atomic number is 35 or more and 60 or less.

13 Claims, 7 Drawing Sheets

(56) References Cited

U.S. PATENT DOCUMENTS

| 2008/0123698 A1* | 5/2008 | Takata | C04B 35/44 |
| | | | 372/22 |
| 2012/0145962 A1 | 6/2012 | Fukuta et al. | |
| 2013/0043430 A1 | 2/2013 | Nakamura et al. | |
| 2013/0270482 A1 | 10/2013 | Jiang et al. | |

FOREIGN PATENT DOCUMENTS

| EP | 2 985 333 | 2/2016 |
| JP | 2012-072331 | 4/2012 |
| JP | 2012-184397 | 9/2012 |
| JP | 2013-227575 | 11/2013 |
| WO | WO-2012-057133 | 5/2012 |
| WO | WO-2013-047193 | 4/2013 |

\* cited by examiner (a)                (b)

FLUORESCENT MATERIAL, SCINTILLATOR, SCINTILLATOR ARRAY, AND RADIATION DETECTOR

TECHNICAL FIELD

The present invention relates to a fluorescent material, which is a garnet-type oxide having a composition including Gd, Al and Ga, a scintillator, a scintillator array, and a radiation detector.

BACKGROUND ART

A scintillator is a member that absorbs radiation, such as α-rays, β-rays, γ-rays and X-rays, to emit fluorescent light. The combination of a scintillator and a photodiode for detecting fluorescent light can be used for detecting the radiation received. It has been used in various fields of applied science, e.g., the medical field such as tomography, the industrial field such as nondestructive inspection, the field of security such as baggage inspection, and the academic field such as high-energy physics, for example.

Patent Document No. 1 discloses a polycrystalline scintillator that has a composition represented by the general formula: $(Gd_{1-w-x-y-z}Y_wLu_xRE_yCe_z)_{3+a}(Al_{1-u-s}Ga_uSc_s)_{5-a}O_{12}$ (where RE is at least one element of Pr, Dy and Er, and $0 \leq a \leq 0.15$, $0.2 \leq w \leq 0.5$, $0 \leq x \leq 0.5$, $0 < y \leq 0.003$, $0.0003 \leq z \leq 0.0167$, $0.2 \leq u \leq 0.6$, $0 \leq s \leq 0.1$), has an Fe content of 0.05 to 1 mass ppm with respect to the total mass including the mass of Fe, has an Si content of 0.5 to 10 mass ppm with respect to the total mass including the mass of Si, and gives an emission intensity temperature coefficient of −0.15%/° C. to +0.15%/° C. at 30° C. to 40° C. when excited by X-rays.

Patent Document No. 1 states that by replacing Gd with Y or with Y and Lu, it is possible to improve the temperature coefficient while suppressing the decrease in emission intensity.

Patent Document No. 2 discloses a solid scintillator made of a polycrystal of a garnet structure oxide represented by the general formula: $(Gd_{1-\alpha-\beta-\gamma}Tb_\alpha Lu_\beta Ce_\gamma)_3(Al_{1-x}Ga_x)_a O_b$ (where $0 < \alpha \leq 0.5$, $0 < \beta \leq 0.5$, $0.0001 \leq \gamma \leq 0.1$, $0 < x < 1$, $4.8 \leq a \leq 5.2$, $11.6 \leq b \leq 12.4$).

Patent Document No. 2 states that Tb contributes to fluorescent light and that codoping of Tb nd Ce improves the emission intensity and the afterglow characteristic.

Patent Document No. 3 discloses a scintillator that is made of a light-emitting substance having a garnet structure, includes Gd, Y, Ce, Ga and Al, is represented by $(Gd_{1-x-y-z}Y_xA_yCe_z)_{3+u}(Ga_{1-m-n}Al_mD_n)_{5-u}O_{12}$: wFO, wherein A is Lu, La, Tb, Dy or a combination thereof, D is In, Sc or a combination thereof, F is a divalent ion, where $0 \leq x < 0.2$, $0 < y < 0.5$, $0.001 < z < 0.05$, $0 < u < 0.1$, $0 \leq n < 0.2$, $0.3 < m < 0.6$ and 10 ppm $\leq w \leq$ 300 ppm, and where $y/x > 1$.

Patent Document No. 3 states that by setting the ratio of Tb with respect to Y to be greater than 1 and using a divalent ion other than Mg (e.g., Ca, Sr, Ba, Zn) as a dopant, it is possible to realize a high decay rate and reduce the afterglow while keeping a high emission intensity.

CITATION LIST

Patent Literature

[Patent Document No. 1] Japanese Laid-Open Patent Publication No. 2012-184397
[Patent Document No. 2] Japanese Laid-Open Patent Publication No. 2012-72331
[Patent Document No. 3] Japanese Laid-Open Patent Publication No. 2013-227575

SUMMARY OF INVENTION

Technical Problem

In the medical field, for example, it is sometimes required to individually or simultaneously image human tissues of different densities, such as bones and blood vessels. In such a case, it is difficult to realize a scintillator made of a single fluorescent material capable of absorbing X-rays over a wide energy band and emitting fluorescent light with a high emission intensity. Therefore, there is a need to make an X-ray detection element using a plurality of scintillators of different characteristics, e.g., one for low energy and another for high energy, for example.

In the field of security, for example, a piece of baggage is the object to be inspected. The inside of a bag may possibly contain items of various materials, and in order to clearly image the items contained, it is necessary to use X-rays of suitable energy levels for the different materials of the items contained.

As described above, characteristics to be required of a scintillator may vary depending on what is to be measured. Therefore, it is preferred to provide a plurality of materials having different characteristics as fluorescent materials for scintillators. Then, it is possible to select a material corresponding to the energy of X-rays, increasing the variety of applications.

In view of such problems, it is an object of the present invention to provide a fluorescent material that has a high emission intensity and has different energy absorption coefficients. It is also an object to provide a scintillator, a scintillator array and a radiation detector using such a fluorescent material.

Solution to Problem

A fluorescent material of the present invention has a composition represented by $(Gd_{1-\alpha-\beta-\gamma}R_\alpha Ce_\beta Tb_\gamma)_{3+a}(Al_{1-u-v}Ga_u Sc_v)_{5-b}O_{12}$, wherein: R is at least one of Y and Lu; a, b, α, β, γ, u and v satisfy ranges below:

$0 \leq a \leq 0.1$, $0 \leq b \leq 0.1$, $0 \leq \alpha \leq 0.8$, $0.0003 \leq \beta \leq 0.005$, $0.02 \leq \gamma \leq 0.2$, $0.27 \leq u \leq 0.75$, and $0 \leq v \leq 0.02$;

a relative density is 99% or more; and an effective atomic number is 35 or more and 60 or less.

In one embodiment:
R is Y; a, b and α satisfy ranges below:

$0 < a \leq 0.1$, $0 < b \leq 0.1$, and $0.3 < \alpha \leq 0.8$;

and
the effective atomic number is 35 or more and 50 or less.
In one embodiment:
R is Lu;
a, b and α satisfy ranges below:

$0 < a \leq 0.1$, $0 < b \leq 0.1$, and $0.3 < \alpha \leq 0.8$;

and
the effective atomic number is 53 or more and 57 or less.
In one embodiment:
R is Lu;
a, b, β, γ, u and v satisfy values below:

a=0.01, b=0.01,

β=0.003/3.01,

γ=0.15/3.01, u=1.96/4.99, and v=0.03/4.99,

α a satisfies a range below:

$0.5 < \alpha \leq 0.8$;

and
the effective atomic number is 54 or more and 56 or less.
In one embodiment:
β satisfies a range below:

$0.0005 \leq \beta \leq 0.003$.

In one embodiment:
v satisfies a range below:
$0.003 \leq v \leq 0.02$.
In one embodiment, a and b satisfy a=b.
In one embodiment:
the fluorescent material includes a first fluorescent material and a second fluorescent material;
for the first fluorescent material,
R is Y;
a, b and α satisfy ranges below:

$0 < a \leq 0.1$, $0 < b \leq 0.1$, and $0.3 < \alpha \leq 0.8$;

and
the effective atomic number is 35 or more and 50 or less;
for the second fluorescent material,
R is Lu;
a, b and α satisfy ranges below:

$0 < a \leq 0.1$, $0 < b \leq 0.1$, and $0.3 < \alpha \leq 0.8$;

and
the effective atomic number is 53 or more and 57 or less.

A scintillator of the present invention includes any fluorescent material set forth above.

A radiation detector of the present invention includes: a scintillator set forth above; and a photoelectric conversion element configured to convert light into an electric signal, a current value or a voltage value.

A scintillator array of the present invention includes: a plurality of first cells made of a first fluorescent material and arranged in a first direction; and a plurality of second cells made of a second fluorescent material and arranged in the first direction, wherein: each first cell is arranged to be adjacent to one of the second cells in a second direction perpendicular to the first direction; each of the first fluorescent material and the second fluorescent material is any fluorescent material set forth above; and the first fluorescent material and the second fluorescent material have different energy absorption coefficients from each other.

Another radiation detector of the present invention includes: a scintillator array set forth above; and a photoelectric conversion element array having a light-receiving surface and including a plurality of photoelectric conversion elements; and the photoelectric conversion elements are arranged in the first direction, and each photoelectric conversion element is adjacent to one of the first cells and one of the second cells in a third direction perpendicular to the first direction and the second direction so that the light-receiving surface opposes the one first cell and the one second cell.

Advantageous Effects of Invention

According to the present invention, it is possible to provide a fluorescent material having a high emission intensity and having various energy absorption coefficients. It is also possible to provide a scintillator, a scintillator array and a radiation detector capable of detecting radiation of various energy intensities.

DESCRIPTION OF EMBODIMENTS

1. Composition of Fluorescent Material

Figure 1:
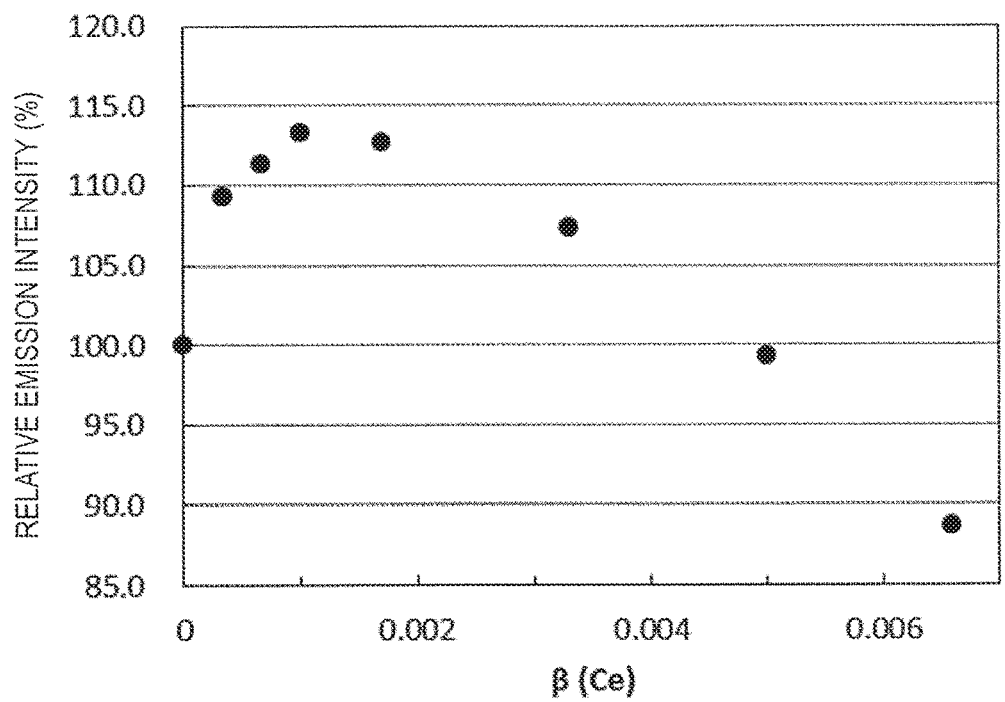
FIG. 1 Shows the relationship between the Ce content β and the relative emission intensity.

The present invention is a fluorescent material having a composition represented by a general formula (hereinafter referred to as "General Formula (1)"): $(Gd_{1-\alpha-\beta-\gamma}R_\alpha Ce_\beta Tb_\gamma)_{3+a}(Al_{1-u-v}Ga_u Sc_v)_{5-b}O_{12}$ (R is at least one element selected from among Y and Lu). Herein, a, b, α, β, γ, u and v satisfy the following relationships:

$0 \leq a \leq 0.1$, $0 \leq b \leq 0.1$, $0 \leq \alpha \leq 0.8$, $0.0003 \leq \beta \leq 0.005$, $0.02 \leq \gamma \leq 0.2$, $0.27 \leq u \leq 0.75$, and $0 \leq v \leq 0.02$.

The relative density of the fluorescent material of the present invention is 99% or more, and the effective atomic number of the fluorescent material is 35 or more and 60 or less.

General Formula (1) of the fluorescent material of the present invention defines that the composition ratio of oxygen is 12. This is because the fluorescent material of the present invention is assumed to have a garnet structure, and the composition ratio is determined with respect to oxygen being the reference. However, the fluorescent material of the present invention does not need to have a complete garnet structure. As described above, depending on the values of a and b, the fluorescent material of the present invention may have an oxygen-deficient or oxygen-excessive garnet structure. That is, whether it is oxygen-deficient or oxygen-excessive, when the composition formula is defined assuming that the composition ratio of oxygen is 12, it is only required that the composition ratios a, b, α, β, γ, u and v of the composition formula satisfy a relationship.

A fluorescent material made of a garnet-type oxide is known to be a stable metal oxide against radiation and to be a fluorescent material having a high emission intensity. Light emission of a fluorescent material occurs when electrons and positive holes produced by X-ray excitation are bound together in light-emitting ion. With a garnet-type oxide including Gd, Al and Ga, by adding Ce and Tb as light-emitting ions, it is possible to improve the emission intensity as compared with a composition using Ce or Tb alone. When either Ce or Tb is added, the emission intensity increases up to a certain amount of addition, but when an excessive amount is added, concentration quenching occurs, thereby lowering the emission intensity, as will be described below. In the present invention, a garnet-type oxide having a composition including Gd, Al and Ga is used as a base material, and it is codoped with slight amounts of both of the light-emitting elements, Ce and Tb, thereby realizing a high emission intensity.

β representing the amount of Ce is in the range of $0.0003 \leq \beta \leq 0.005$. When β is less than 0.0003, the number of Ce atoms, being the light-emitting element, is too small, and it is not possible to efficiently convert the energy of absorbed X-rays into light energy. When β is greater than 0.005, the distance between Ce atoms becomes too small, and energy migration (so-called "concentration quenching") occurs, thereby lowing the emission intensity. In order to achieve a particularly high emission intensity, β is preferably in the range of $0.0003 \leq \beta \leq 0.004$. More preferably, $0.0005 \leq \beta \leq 0.003$.

Similarly, γ representing the amount of Tb is in the range of $0.02 \leq \gamma \leq 0.2$. When γ is less than 0.02, the number of Tb atoms, being the light-emitting element, is too small, and it is not possible to efficiently convert the energy of absorbed X-rays into light energy. When γ is greater than 0.2, the distance between Tb atoms becomes too small, and energy migration (so-called "concentration quenching") occurs, thereby lowing the emission intensity. In order to achieve a particularly high emission intensity, γ is preferably in the range of $0.03 \leq \gamma \leq 0.15$. More preferably, $0.03 \leq \gamma \leq 0.1$.

According to an in-depth study by the present inventor, when either Ce or Tb, alone, is added to a garnet-type oxide including Gd, Al and Ga, the fluorescent intensity increases as the amount of addition of Ce or Tb increases up to a proportion of β=0.001 or γ=0.05. If the amount of addition is greater than these values, the emission intensity rather decreases.

It was found, however, that even with the amount of addition M of Ce or Tb alone that would decrease the emission intensity, if the addition is divided between Ce and Tb by adding both Tb and Ce so that the total of the amount of TB added and the amount of CE added is M, for example, it is possible to further increase the emission intensity. It is believed that this is because Tb and Ce differ from each other in terms of how electrons transition to cause fluorescent light (4f-4f electron transition for Tb, and 4f-5d transition for Ce), and electrons and positive holes produced by X-ray excitation can be bound together efficiently by codoping of light-emitting elements having different transition energy levels.

The range of a and that of b are both $0 \leq a \leq 0.1$ and $0 \leq b \leq 0.1$.

While a and b preferably take the same value, they may take different values due to the solid solution of impurity elements such as Si and Fe contained in raw materials or the weighing error. When a≠b, an oxygen defect is likely to occur in the crystal, and the emission intensity may lower.

When a is a negative value below 0, ion voids are produced in the $(Gd_{1-\alpha-\beta-\gamma}R_\alpha Ce_\beta Tb_\gamma)$ site, occupied by rare earth elements, thereby increasing the afterglow. Also, the emission intensity decreases significantly. Therefore, a is set to be 0 or more. In mass production, it is preferred that 0<a and 0<b and it is more preferred that $0.0001 \leq a$ and $0.0001 \leq b$, taking composition variations into consideration. Note however that when a and b are greater than 0.1, a different phase (perovskite phase $GdAlO_3$), which is not of the garnet type, is more likely to be produced. This different phase has a different refractive index from that of the garnet-type phase of the base material, thereby causing light scattering and lowering the emission intensity.

In order to achieve both a particularly high emission intensity and a low afterglow characteristic, it is more preferred that a is in the range of $0 < a \leq 0.07$ and b is in the range of $0 < b \leq 0.07$, and it is even more preferred that they are in the ranges of $0.0001 \leq a \leq 0.05$ and $0.0001 \leq b \leq 0.05$.

It is assumed that α representing the amount of R element (Y or Lu) is 0≤α≤0.8. Preferably, α satisfies 0.3<α≤0.8, and more preferably α satisfies 0.5<α≤0.8.

As described above, with the value of α being in the range of 0≤α≤0.8, a fluorescent material having a composition represented by General Formula (1) has a high fluorescent emission intensity. On the other hand, by adjusting α in General Formula (1) within the range of 0≤α≤0.8, it is possible to adjust the proportion by which Gd is replaced with R element, thus varying the effective atomic number of the fluorescent material.

It is assumed that u representing the amount of Ga is 0.27≤u≤0.75.

When u is less than 0.27, the perovskite phase described above is formed, lowering the emission intensity. The sinterability also lowers. For example, when u≤0.2, the sinterability lowers, resulting in many voids. On the other hand, when u is greater than 0.75, the emission intensity lowers, significantly increasing the afterglow. In order to achieve a particularly high relative emission intensity, u is preferably in the range of 0.35≤u≤0.70, and more preferably in the range of 0.4≤u≤0.6.

It is assumed that v representing the amount of Sc is 0≤v≤0.02.

Sc is an added element that improves the emission intensity and reduces the afterglow.

Ga is a +3-valent ion, but its valence likely changes to +1. When Ga becomes +1-valent in a garnet-type structure, the emission intensity lowers and the afterglow increases. The ionic radius of $Sc^{3+}$ is greater than those of $Al^{3+}$ and $Ga^{3+}$, and it is believed to suppress the change of the valence of $Ga^{3+}$. In order to achieve a particularly high relative emission intensity ratio, v is preferably within the range of 0.003≤v≤0.02.

With Sc added thereto, the fluorescent material obtained after being sintered has a structure in which minute crystals are present closely together. Generally, even when a polycrystalline ceramic breaks somewhere inside thereof, there is a high possibility that the extension of the crack caused by the break is stopped by crystal grains. Therefore, as minute crystals are distributed more closely together, the fracture toughness is higher, resulting in a high mechanical strength.

The range of the average crystal grain size of the sintering block may be any range as long as there is no void in the sintering block and a sufficient density can be achieved. The density after being sintered is more likely to be high when a sufficient density is achieved upon shaping before sintering. Therefore, it is preferred that the average crystal grain size is 10 μm or less when in a powder state, and it is also preferred that it is of a similar value after being sintered.

When v representing the amount of Sc is 0.003 or more, the average crystal grain size of the fluorescent material can be reduced to be 5 μm or less. When v is 0.02 or less, the emission intensity can be similar to or greater than that of the fluorescent material of $Gd_2O_2S$:Tb.

The relative density of the fluorescent material of the present invention is 99% or more. The relative density is calculated as follows. First, the lattice constant where a=0, b=0, α=0, β=0, γ=0, u=2/5 and v=0 (composition formula: $Gd_3Al_3Ga_2O_{12}$) in General Formula (1) is obtained from data of ICDD (International Centre for Diffraction Data), and the volume is calculated based on the lattice constant. Then, the formula weight is calculated, as mass, from the composition formula of the sample of which the relative density is being calculated, and the density is obtained, as the theoretical density, from the formula weight and the volume. Then, the measured density of the fluorescent material is obtained, and is divided by the theoretical density above, thus calculating the relative density. When the relative density is small, the absorption of X-rays will be insufficient, and therefore it is preferably 99% or more. The calculation is based on the lattice constant where a=0, b=0, α=0, β=0, γ=0, u=2/5 and v=0 in order to replace Gd element with R element based on the composition ratio of α, and the relative density in some cases exceeds 100%. Note that when it is far exceeded, there is a high possibility that the crystalline structure has altered. It has been confirmed from examples of the present invention that a garnet structure is maintained as long as the relative density is 102.5% or less.

The fluorescent material of the present invention includes no sulfur. Therefore, unlike $Gd_2O_2S$-based fluorescent materials, sulfides are not used as a material, and it is therefore possible to obtain a sintering block having a high density, thus increasing the transmittance, allowing a high emission intensity to be realized.

The effective atomic number (effective atomic number) of the fluorescent material of the present invention is 35 or more and 60 or less. The effective atomic number is defined by the following expression.

$$Z_{\mathit{eff}} = \sqrt[2.94]{f_1 \times (z_1)^{2.94} + f_2 \times (z_2)^{2.94} + f_3 \times (z_3)^{2.94}} \quad \text{[Exp. 1]}$$

Herein, $f_1, f_2, f_3, \ldots$, each represent the electron number ratio of an element with respect to the electron number of all elements of General Formula (1), and $Z_1, Z_2, Z_3, \ldots$ each represent the atomic number of an element.

A larger effective atomic number allows for absorption of higher energy, and a smaller effective atomic number allows for transmittance of higher energy. For example, a ceramic scintillator, represented by the composition formula $Gd_2O_2S$, which is a fluorescent material generally used in a radiation detector of an X-ray CT, has an effective atomic number of 59.5, and the effective atomic number of a Gd—Al—Ga garnet scintillator is about 52. Herein, it is possible to produce a scintillator having separate energy ranges of X-rays to be observed, by using a fluorescent material whose effective atomic number is between 52 and 59 and a fluorescent material whose effective atomic number is in the range less than 52. In order to realize two scintillators whose energy ranges of X-rays to be absorbed are significantly separated from each other, the effective atomic numbers of the fluorescent materials of the respective scintillators are preferably far apart from each other.

As shown in General Formula (1) of effective atomic numbers described above, the effective atomic numbers depend on the composition of the material. That is, when elements to be used and composition ratios thereof are determined appropriately and the relative density described above is 99% or more, it is possible to obtain a fluorescent material capable of absorbing high energy based on the effective atomic number.

In the present invention, if composition R=Y, it is preferred that 0.3<α≤0.8 and the effective atomic number is 35 or more and 50 or less, and it is more preferred that 0.5<α≤0.8 and the effective atomic number is 37 or more and 45 or less. If R=Lu, it is preferred that 0.3<α≤0.8 and the effective atomic number is 53 or more and 57 or less, and it is more preferred that 0.5<α≤0.8 and the effective atomic number is 54 or more and 56 or less. As described above, by determining the content α of R element in the range described above depending on the element of R, it is possible to easily produce, based on General Formula (1), a combination of fluorescent materials between which there is a significant difference in effective atomic number.

For example, it is possible to easily produce a combination of a first fluorescent material in which R=Y and $0.3<\alpha\leq0.8$ in General Formula (1) and the effective atomic number is 35 or more and 50 or less, and a second fluorescent material in which R=Lu and $0.3<\alpha\leq0.8$ in General Formula (1) and the effective atomic number is 53 or more and 57 or less.

The effective atomic number of the fluorescent material can be adjusted based on the element to be selected as R and a, b, $\alpha$, $\beta$, $\gamma$, u and v representing the ratios of the elements. Particularly, based on whether Y or Lu is selected as R element and based on the composition ratio $\alpha$ of R element, it is possible to vary the effective atomic number of the fluorescent light without significantly lower the emission intensity thereof.

The fluorescent material of the present invention has a composition represented by General Formula (1), and with the density being in the range described above, it is possible to realize a high fluorescent emission intensity. By selecting an element to be R in the range represented by General Formula (1) and adjusting the composition ratios of the elements, it is possible to realize a fluorescent material having an effective atomic number of 35 or more and 60 or less. Thus, it is possible to realize a fluorescent material having a high emission intensity and different energy absorption coefficients. Therefore, a fluorescent material represented by General Formula (1) can suitably be used detecting radiation of different energy levels.

2. Method for Producing Fluorescent Material

An example method for producing a fluorescent material will now be described. The present invention is not limited thereto.

<Inorganic Salt Method>

The inorganic salt method is a method in which a precursor is obtained by dissolving a material in an acid, or the like, and the precursor is dried and sintered.

For example, as materials, gadolinium nitrate, yttrium nitrate or lutetium nitrate, cerium nitrate, terbium nitrate, aluminum nitrate, gallium nitrate, scandium nitrate, etc., which have been weighed to the target composition, are dissolved in pure water to obtain a precursor solution. Alternatively, the starters may all be an acetate, a formate, a lactate, etc., or a combination thereof. Or, an oxide material may be dissolved in a nitric acid aqueous solution or a hydrochloric acid aqueous solution. In addition, a citric acid may be added thereto, and it may be stirred while being heated to 60° C. to 80° C., thereby increasing the viscosity through polymerization. In this process, small amounts of polyvinyl alcohol, polyvinylpyrrolidone, etc., may be added as an adjustment of viscosity. Then, there is obtained a gel-like precursor whose viscosity has been adjusted to be suitable for shaping.

The precursor may be shaped into a sheet form by a doctor blade method, or the like. The resultant sheet-shaped molding block is dried at about 100° C. to 150° C., and then held in oxygen at a temperature of 1100° C. to 1500° C. for 0.5 to 5.0 hours, thus sintering the molding block. Thus, there is obtained a sheet-shaped fluorescent material.

<Slurry Method>

The slurry method is a method in which a material provided in a slurry form is mixed with a binder, and then the material is dried and sintered.

For example, as the material, an oxide material fine powder whose average grain size is 1 μm or less including gadolinium oxide, yttrium oxide, lutetium oxide, cerium oxide, terbium oxide, aluminum oxide, gallium oxide and scandium oxide, which have been appropriately weighed to the target composition, is put into a container together with a milling medium such as alumina balls, and a solvent such as water or ethanol, and the material is subjected to wet ball milling using an apparatus for spinning the container, thus producing a slurry. In this process, nitrates, or the like, may be used for substances to be added in small amounts such as cerium and terbium, which are light-emitting ions. A dispersant, a binder, etc., may be added, in advance or after mixing, to the produced slurry. It is possible to obtain a sheet-shaped molding block by using a sheet shaping apparatus, or the like, for applying this slurry on a film with a constant thickness using a blade. The sheet-shaped molding block is dried at about 100° C. to 150° C., and then held in oxygen at a temperature of 1100° C. to 1500° C. for 0.5 to 5.0 hours, thus sintering the sheet-shaped molding block. Thus, there is obtained a sheet-shaped fluorescent material.

<Others>

For obtaining a fluorescent material in a powder form, ordinary methods for producing a ceramic sintering block may be used.

For example, as the material, oxides, carbonates, or the like, of gadolinium, yttrium or lutetium, cerium, terbium, aluminum, gallium and scandium are weighed so that these elements satisfy the target composition ratio, with a solvent added thereto as necessary, and the material is mixed and milled by a ball mill, or the like. After the mixture is dried, the mixture is put into a suitable container or shaped into a suitable shape and held in oxygen at a temperature of 1100° C. to 1500° C. for 0.5 to 5.0 hours, thus sintering the mixture. The obtained sintering block can be milled by a ball mill, or the like, thereby obtaining a fluorescent material in a powder form. Or, it may be used, as it is, as a fluorescent material, without being milled.

3. Embodiments Using Fluorescent Material

[Scintillator]

A plate-shaped fluorescent material, a shaped fluorescent material or a fluorescent material in a powder form, produced by a method described above, may be used, as it is, as a scintillator. A fluorescent material in a powder form may be dispersed in a resin, and the resin may be shaped, thereby producing a scintillator having a desired shape.

[Scintillator Array]

Figure 8:
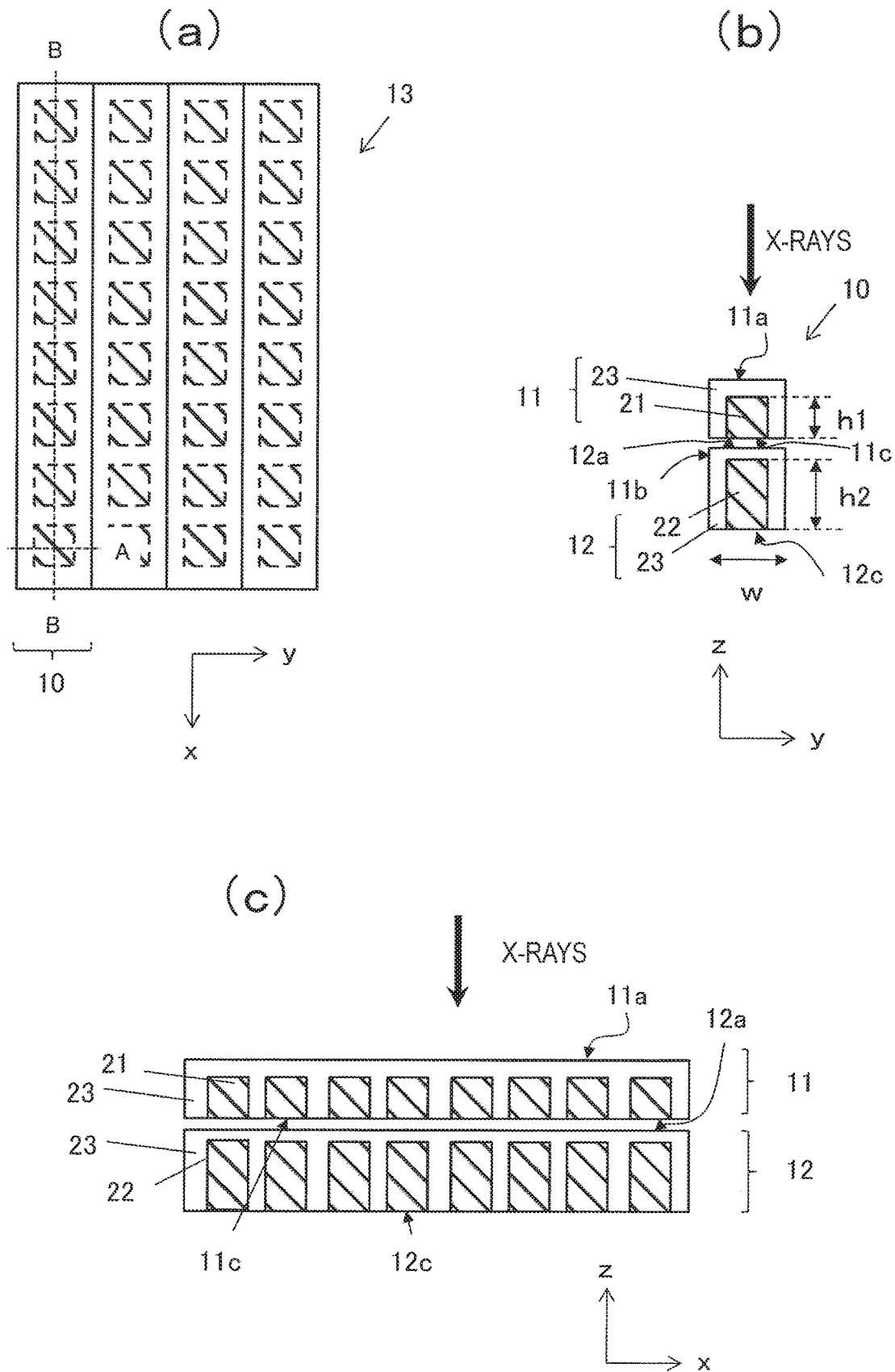
FIG. 8 shows a scintillator array according to one embodiment, wherein (a) shows a top view, and (b) and (c) are cross-sectional views taken along line A-A and line B-B, respectively, of (a).

FIG. 8 shows a scintillator array according to one embodiment of the present invention. FIG. 8(a) is a top view of a scintillator array 13, and FIG. 8(b) shows a cross section taken along A-A in FIG. 8(a). FIG. 8(c) shows a cross section taken along B-B in FIG. 8(a).

The scintillator array 13 has a dual array structure including two different scintillator arrays with different detection sensitivities, i.e., different energy absorption coefficients. As shown in FIG. 8(a), the scintillator array 13 includes a plurality of one-dimensional scintillator arrays 10 arranged in a third direction (the y direction) perpendicular to a first direction (the x direction), each scintillator array 10 including a plurality of scintillators arranged in the first direction. As shown in FIGS. 8(b) and 8(c), each scintillator array 10 includes a first array 11 including an array of first cells 21 made of a first fluorescent material, and a second array 12 including an array of second cells 22 made of a second fluorescent material. The first array 11 and the second array 12 include a resin layer 23 surrounding the first cells 21 and the second cells 22.

In the first array 11 and the second array 12, the first cells 21 and the second cells 22 are each arranged in the first direction (the x direction). Each first cell 21 of the first array 11 is arranged so as to be adjacent to one of the second cells 22 of the second array 12 in a second direction (the z direction) perpendicular to the first direction and the third direction.

The height of the first cell 21 and the height of the second cell 22 in the second direction are h1 and h2, respectively. The heights h1 and h2 of the first cell 21 and the second cell 22 can be determined based on the intensities of radiation to be detected.

The first array 11 has an incident surface 11a on which X-rays are incident, and a detection surface 11c for detecting fluorescent light produced by the first cells 21. The first cells 21 each have one surface thereof exposed on the detection surface 11c. Similarly, the second array 12 has an incident surface 12a on which X-rays are incident, and a detection surface 12c for detecting fluorescent light produced by the second cells 22. The second cells 22 each have one surface thereof exposed on the detection surface 12c. The detection surface 11c of the first array 11 and the incident surface 12a of the second array 12 are opposing each other.

X-rays that have entered through the incident surface 11a of the first array 11 pass through the first cells 21. In this process, some of the X-rays are absorbed, and the first cells 21 emit fluorescent light. The X-rays that have not been absorbed exit through the detection surface 11c to enter the second cells 22 through the incident surface 12a of the second array 12. The second cells 22 absorb X-rays to emit fluorescent light. Therefore, with photoelectric conversion elements for detecting fluorescent light being arranged on the detection surface 11c and on the detection surface 12c, it is possible to detect fluorescent light of the first cell 21 and the second cell 22.

The first fluorescent material and the second fluorescent material are each represented by General Formula (1), and have different compositions from each other. For example, when the first fluorescent material is irradiated with X-rays, which are absorbed and transmitted at the same time, to irradiate the second fluorescent material with the X-rays, the energy absorption coefficient of the first fluorescent material is preferably smaller than the energy absorption coefficient of the second fluorescent material.

The scintillator array 13 can be produced by the following method, for example. First, a first fluorescent material and a second fluorescent material having different energy absorption coefficients are produced. The compositions of the first fluorescent material and the second fluorescent material can be determined, using General Formula (1), by for example varying α in Composition Formula (1) and choosing different ones between Y an Lu as element R. Then, the first cells 21 and the second cells 22 are produced from the first fluorescent material and the second fluorescent material through sintering, for example. The first array 11 is produced by arranging the first cells 21 with a predetermined interval therebetween, and encapsulating the first cells 21 with a resin 23. Similarly, the second array 12 is produced by arranging the second cells 22 with a predetermined interval therebetween, and encapsulating the second cells 22 with the resin 23. These arrays are layered on each other, completing the scintillator array 13.

The energy absorption coefficient of the first fluorescent material of the first cells 21 in the scintillator array 13 is smaller than the energy absorption coefficient of the second fluorescent material of the second cells 22. An example of utilizing this to separately detect energy levels will now be described.

Generally, body parts such as blood vessels and muscles in the subject, as compared with body parts such as bones, are likely to absorb soft X-rays whose energy level is relatively low and to transmit therethrough hard X-rays whose energy level is relatively high. On the other hand, body parts such as bones, as compared with body parts such as blood vessels and muscles, are likely to absorb hard X-rays whose energy level is relatively high. Therefore, when a subject is imaged using either soft X-rays or hard X-rays, either body parts such as blood vessels and muscles or body parts such as bones may be clearly imaged while leaving the other not clearly imaged.

With the scintillator array 13, it is possible to obtain a clear image of both body parts such as blood vessels and muscles and body parts such as bones. For example, a subject is irradiated with a plurality of X-rays of different energy intensity distributions, such as soft X-rays and hard X-rays, simultaneously or at shifted points in time, so that the X-rays enter the scintillator array 13. Since the first cells 21 have a small energy absorption coefficient, only X-rays of lower energy are absorbed by the first cells 21 and X-rays of higher energy are not substantially absorbed but pass therethrough. X-rays of higher energy that have passed through the first cells 21 enter the second cells 22. Since the energy absorption coefficient of the second fluorescent material is larger than that of the first fluorescent material, X-rays that have passed through the first cells 21 to enter the second cells 22 are absorbed by the second cells 22. Thus, the second cells 22 emit fluorescent light according to the energy intensity distribution other than those of X-rays that have been absorbed by the first cells 21. Therefore, an image formed by X-rays detected by the first cells 21 clearly shows body parts such as blood vessels and muscles. An image formed by X-rays detected by the second cells 22 clearly shows body parts such as bones. By combining these two images together, it is possible to obtain an image that clearly shows both body parts such as blood vessels and muscles and body parts such as bones.

As described above, the scintillator array 13 is capable of detecting X-rays of different energy levels. The first fluorescent material and the second fluorescent material of the scintillator array 13, which suitably absorb X-rays of different energy levels, can be produced by using the same General Formula (1).

The scintillator array 13 shown in FIG. 8 is a two-dimensional array including the first cells 21 and the second cells 22 arranged in the first direction (the x direction) and in the third direction (the y direction). However, the scintillator array of the present invention is not limited to a two-dimensional array. The scintillator array 10 may be used alone as a one-dimensional array.

[Radiation Detector]

It is possible to produce a radiation detector having high sensitivity, high resolution and little radiation degradation, by combining a scintillator with photoelectric conversion element for converting light into an electric signal, a current value or a voltage value.

When a plate-shaped fluorescent material, a shaped fluorescent material or a fluorescent material in a powder form is used as it is as a scintillator, a radiation detector can be produced by arranging a photoelectric conversion element for detecting fluorescent light of such a fluorescent material adjacent to the fluorescent material. When a plate-shaped fluorescent material is used, a two-dimensional photoelectric conversion element array may be used.

Figure 9:
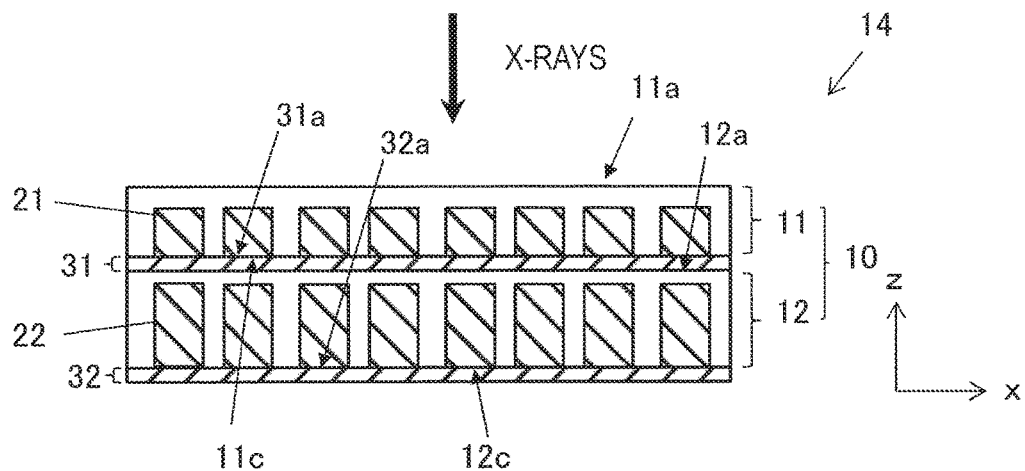
FIG. 9 A schematic cross-sectional view (side) showing a radiation detector according to one embodiment.

FIG. 9 is a cross-sectional view showing a radiation detector 14 of a dual array structure according to an embodiment of the present invention. The radiation detector 14 includes the scintillator array 13 shown in FIG. 8, and a plurality of photoelectric conversion element arrays 31 and 32. The photoelectric conversion element arrays 31 and 32 each include a plurality of photoelectric conversion elements arranged in the first direction (the x direction), for example. The photoelectric conversion element may be a photodiode such as a silicon photodiode, for example.

In each scintillator array 10 included in the scintillator array 13, the photoelectric conversion element array 31 is arranged between the detection surface 11c of the first array 11 and the incident surface 12a of the second array 12, and a light-receiving surface 31a of the photoelectric conversion element array 31 is opposing the detection surface 11c. The photoelectric conversion element array 32 is arranged on the detection surface 12c of the second array 12, and a light-receiving surface 32a thereof is opposing the detection surface 12c.

With the radiation detector 14, the first fluorescent material of the first cells 21 and the second fluorescent material of the second cells 22 have different energy absorption coefficients, making it possible to detect X-rays of different energy levels using a single radiation detector 14. Thus, using the radiation detector 14, a living body including different internal tissues therein, an object to be inspected the inside of which is made of different materials, a piece of baggage containing articles of different materials therein, etc., can be irradiated with X-rays of different energy levels and the X-rays can be detected, thus obtaining an X-ray image that shows the internal structure more clearly.

The radiation detector 14 shown in FIG. 9 is a two-dimensional array including the first cells 21 and the second cells 22 arranged in the first direction (the x direction) and in the third direction (the y direction). However, a one-dimensional radiation detector may be produced by using the one-dimensional scintillator array 10 and the photoelectric conversion element arrays 31 and 32.

Figure 10:
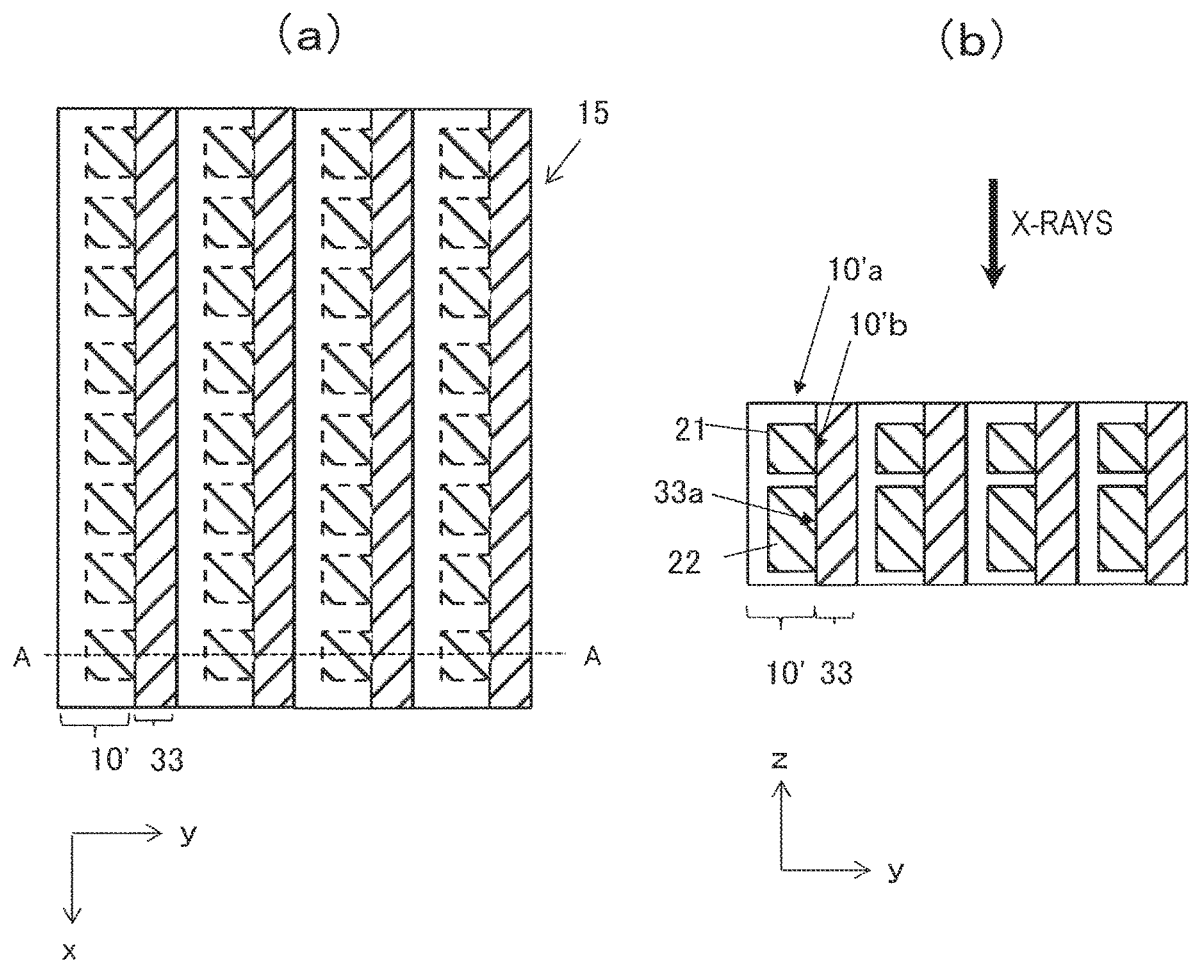
FIG. 10 (a) is a schematic top view showing a radiation detector according to another embodiment, and (b) is a cross-sectional view taken along line A-A of (a).

As shown in FIGS. 10(a) and 10(b), the photoelectric conversion element arrays may be arranged so that X-rays that have passed through the first cell 21 of the first fluorescent material enter the second cell 22 of the second fluorescent material without passing through the photoelectric conversion elements. Specifically, a radiation detector 15 shown in FIGS. 10(a) and 10(b) includes a plurality of one-dimensional scintillator arrays 10' and a plurality of photoelectric conversion element arrays 33. The scintillator array 10' includes the first array 11 and the second array 12 of the one-dimensional scintillator array 10 shown in FIG. 8 attached together. The scintillator array 10' has an incident surface 10'a, and a detection surface 10'b perpendicular to the incident surface 10'a. The photoelectric conversion element array 33 is arranged adjacent to the scintillator array 10' in the third direction (the y direction). The first cells 21 and the second cells 22 each have one surface thereof exposed on the detection surface 10'b of the scintillator array 10', and a light-receiving surface 33a of the photoelectric conversion element array 33 is opposing the detection surface 10'b in the third direction. In the radiation detector 15, the light-receiving surface 33a of the photoelectric conversion element array 33 is parallel to the direction in which X-rays pass, and X-rays that have entered through the incident surface 10'a of the scintillator array 10' do not pass through the light-receiving surface 33a of the photoelectric conversion element array 33. Thus, by preventing X-rays from passing through the photoelectric conversion element array, it is possible to reduce the damage to the photoelectric conversion elements.

The embodiment described above is directed to a dual array scintillator and a dual array radiation detector including two fluorescent materials having different energy absorption coefficients. However, it is possible to realize a scintillator multi array and a multi array radiation detector using three or more fluorescent materials having different energy absorption coefficients.

4. Examples

Example 1

The relationship between the Ce content and the Tb content and the relative emission intensity was studied.

Light emission of a scintillator occurs when electrons and positive holes produced by X-rays excitation are bound together in light-emitting ion. In the composition of the present invention, the light-emitting ions are two elements of Ce and Tb.

The relationship between the Ce content $\beta$ and the relative emission intensity will be stated. Gadolinium oxide, yttrium oxide, terbium oxide, cerium nitrate (which may be cerium oxide; this similarly applies hereinbelow), aluminum oxide, gallium oxide and scandium oxide were weighed to the composition formula shown in Table 1. In this process, the Ce content $\beta$ was set to 0, 0.00033, 0.00066, 0.0010, 0.0017, 0.0033, 0.0050 and 0.0066 in the composition formula below. These material powders were put in a resin pot and subjected to wet ball milling using alumina balls for 40 hours, thus producing a material slurry. The produced slurry was dried and then pressed into a flat plate shape, which was sintered in oxygen. Sintering was done by holding the material at 1660° C. for 12 hours. The resultant fluorescent material was subjected to an ICP-AES analysis (high-frequency inductively-coupled plasma emission spectrometric analysis, OPTIMA-3300XL from PerkinElmer Co., Ltd.) to identify the composition thereof, and it was confirmed to be a fluorescent material of the composition shown in Table 1. Using the composition of Table 1, the effective atomic number was calculated to be 50.7 to 50.8. The sintering temperature was so determined that the relative density would be 99% or more, and the relative density of the actual fluorescent material obtained was 99% or more. The average crystal grain size was about 3 µm.

The relationship between the Ce content $\beta$ and the relative emission intensity is shown in FIG. 1.

TABLE 1

| Composition (atomic ratio) of $(Gd_{1-\alpha-\beta-\gamma}R_{\alpha}Ce_{\beta}Tb_{\gamma})_{3+a}(Al_{1-u-v}Ga_{u}Sc_{v})_{5-b}O_{12}$ | | | | | |
|---|---|---|---|---|---|
| a, b | α(Y) | β(Ce) | γ(Tb) | u(Ga) | v(Sc) |
| 0.01 | 0.033 | 0~0.0066 | 0.05 | 0.393 | 0.006 |

The relative emission intensity of FIG. 1 is a value (%) with the emission intensity of $Gd_2O_2S$:Tb being 100%. The emission intensity was measured by using a silicon photodiode (S2281 from Hamamatsu Photonics K. K.). The emission intensity was measured similarly in the subsequent examples.

As can be seen in FIG. 1, a relative emission intensity greater than 100% was achieved for values of $\beta$ in the range of $0.0003 \leq \beta \leq 0.005$. Since Ce can improve the emission intensity even in small amounts, it is possible to sufficiently increase the emission intensity when β is 0.0003 or more. A relative emission intensity of 105% or more was achieved for values of β in the range of 0.0003≤β≤0.004, and a relative emission intensity of 110% or more was achieved for values of β in the range of 0.0005≤β≤0.003.

The relationship between the Tb content γ and the relative emission intensity will be stated. Gadolinium oxide, yttrium oxide, terbium oxide, cerium nitrate, aluminum oxide, gallium oxide and scandium oxide were weighed to the composition formula shown in Table 2. In this process, the Tb content γ was set to 0, 0.01, 0.017, 0.033, 0.05, 0.066, 0.10, 0.13 and 0.20 in the composition formula below. These material powders were put in a resin pot and subjected to wet ball milling using alumina balls for 40 hours, thus producing a material slurry. The produced slurry was dried and then pressed into a flat plate shape, which was sintered in oxygen. Sintering was done by holding the material at 1660° C. for 12 hours. The resultant fluorescent material was subjected to an ICP-AES analysis to identify the composition thereof, and it was confirmed to be a fluorescent material of the composition shown in Table 2. Using the composition of Table 2, the effective atomic number was calculated to be 50.7 to 50.9. The sintering temperature was so determined that the relative density would be 99% or more, and the relative density of the actual fluorescent material obtained was 99% or more. The average crystal grain size was about 3 μm.

Figure 2A:
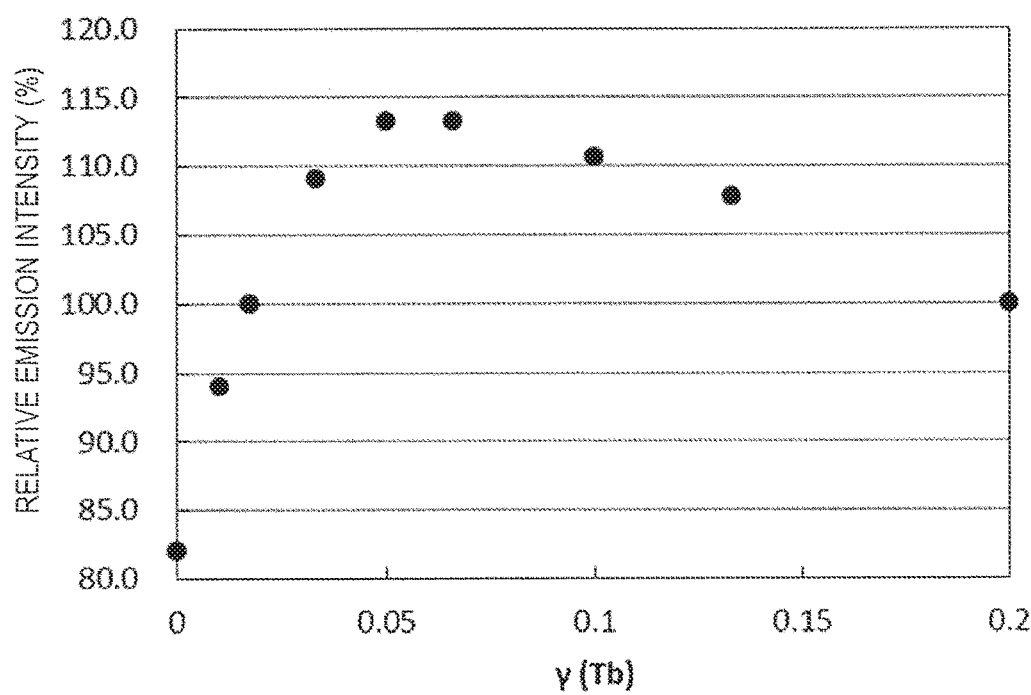
FIG. 2A Shows the relationship between the Tb content γ and the relative emission intensity.

The relationship between the Tb content γ and the relative emission intensity is shown in FIG. 2A.

TABLE 2

| Composition (atomic ratio) of $(Gd_{1-\alpha-\beta-\gamma}R_\alpha Ce_\beta Tb_\gamma)_{3+a}(Al_{1-u-v}Ga_u Sc_v)_{5-b}O_{12}$ | | | | | |
|---|---|---|---|---|---|
| a, b | α(Y) | β(Ce) | γ(Tb) | u(Ga) | v(Sc) |
| 0.01 | 0.033 | 0.001 | 0~0.20 | 0.393 | 0.006 |

A sufficiently high emission intensity was achieved for values of γ in the range of 0.02≤γ≤0.2. It is possible to further increase the emission intensity by setting the value of γ in the range of 0.03≤γ≤0.15.

As shown in Table 2, the result of FIG. 2A shows a case where the amount of addition β of Ce is 0.001, and it can be seen from FIG. 1 that the emission intensity of the fluorescent material is maximized for Ce when the amount of addition β of Ce is 0.001. Therefore, FIG. 2A shows that even when Ce is contained under a condition such that the emission intensity is maximized, the emission intensity can be further increased by adding Tb, and that the emission intensity is maximized when the amount of addition γ of Tb is about 0.05.

Similarly, the result of FIG. 1 shows a case where the amount of addition γ of Tb is 0.05, and FIG. 1 shows that even when Tb is contained under a condition such that the emission intensity is maximized, the emission intensity can be further increased by adding Ce, and that the emission intensity is maximized when the amount of addition β of Ce is about 0.001.

It can be seen from these results that the total amount of addition of Ce and Tb can be set higher as compared with a case where Ce or Tb alone is added to the fluorescent material, and that it is therefore possible to achieve a higher emission intensity as compared with a case where Ce or Tb alone is added to the fluorescent material.

Figure 2B:
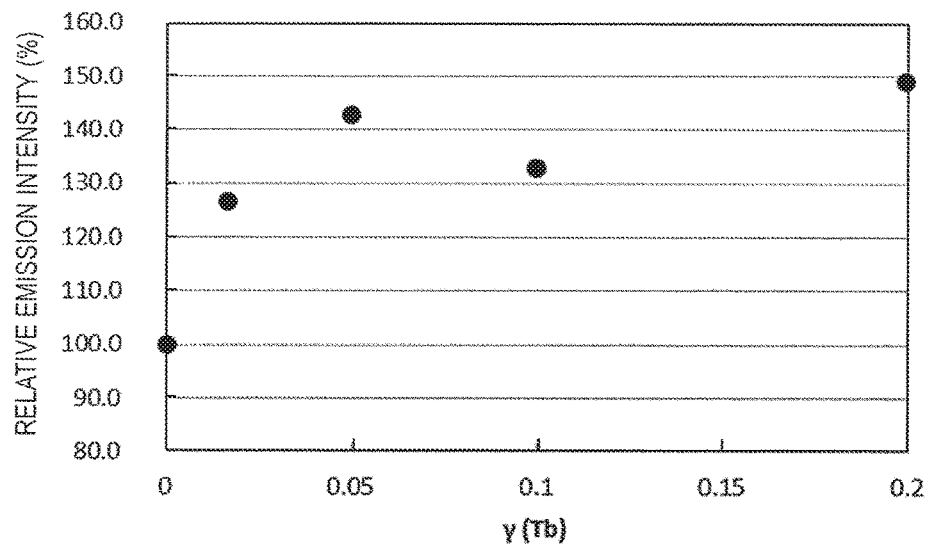
FIG. 2B Shows the relationship between the Tb content γ and the relative emission intensity.

Moreover, the relationship between the Tb content γ and the relative emission intensity when R=Y and α=0.797 will be described below. Gadolinium oxide, yttrium oxide, terbium oxide, cerium nitrate, aluminum oxide, gallium oxide and scandium oxide were weighed to the composition formula shown in Table 3. In this process, the Tb content γ was set to 0, 0.02, 0.05, 0.1 and 0.199 in the composition formula below. These material powders were put in a resin pot and subjected to wet ball milling using alumina balls for 40 hours, thus producing a material slurry. The produced slurry was dried and then pressed into a flat plate shape, which was sintered in oxygen. Sintering was done by holding the material at 1700° C. for 12 hours. Using the composition of Table 3, the effective atomic number was calculated to be 37.5 to 38.0, and the energy absorption coefficient was 3.8 to 4.2. The sintering temperature was so determined that the relative density would be 99% or more, and the relative density of the actual fluorescent material obtained was 99% or more. The relationship between the Tb content γ and the relative emission intensity when R=Y and α=0.797 is shown in FIG. 2B.

TABLE 3

| Composition (atomic ratio) of $(Gd_{1-\alpha-\beta-\gamma}R_\alpha Ce_\beta Tb_\gamma)_{3+a}(Al_{1-u-v}Ga_u Sc_v)_{5-b}O_{12}$ | | | | | |
|---|---|---|---|---|---|
| a, b | α(Y) | β(Ce) | γ(Tb) | u(Ga) | v(Sc) |
| 0.01 | 0.797 | 0.005 | 0~0.199 | 0.419 | 0.012 |

A sufficiently high emission intensity was achieved for values of γ in the range of 0.02≤γ≤0.199. It is possible to further increase the emission intensity by setting the value of γ in the range of 0.05≤γ≤0.199. The results indicated that it is possible to achieve a higher emission intensity by increasing the amount of Y from α=0.033 to α=0.797.

Example 2

The relationship between the Y amount and the Lu amount, and the relative emission intensity, the effective number, the relative density and the energy absorption coefficient was studied. Gadolinium oxide, yttrium oxide or lutetium oxide, terbium oxide, cerium nitrate, aluminum oxide, gallium oxide and scandium oxide were weighed to the composition formula shown in Table 4. In this process, the Y content α was set to 0.033, 0.325, 0.617, 0.783 and 0.949 in the composition formula below. The Lu content α was set to 0, 0.285, 0.617, 0.783 and 0.949 in the composition formula below. These material powders were put in a resin pot and subjected to wet ball milling using alumina balls for 60 hours, thus producing a material slurry. The produced slurry was dried and then pressed into a flat plate shape, which was sintered in oxygen. Sintering was done by holding the material at any temperature from 1660° C. to 1700° C. for 12 hours. The resultant fluorescent material was subjected to an ICP-AES analysis to identify the composition thereof, and it was confirmed to be a fluorescent material of the composition shown in Table 4. The average crystal grain size was about 3.5 to 8.1 μm.

The effective atomic number was obtained based on the formula above. The measured density of the resultant fluorescent material was obtained by an in-liquid weighing method using water based on the Archimedes' principle. The relative density was obtained by dividing the measured density by the theoretical density. The energy absorption coefficient was obtained by analyzing the composition by ICP to obtain the linear energy absorption coefficient from the composition and then dividing the linear energy absorption coefficient by the density.

Figure 3A:
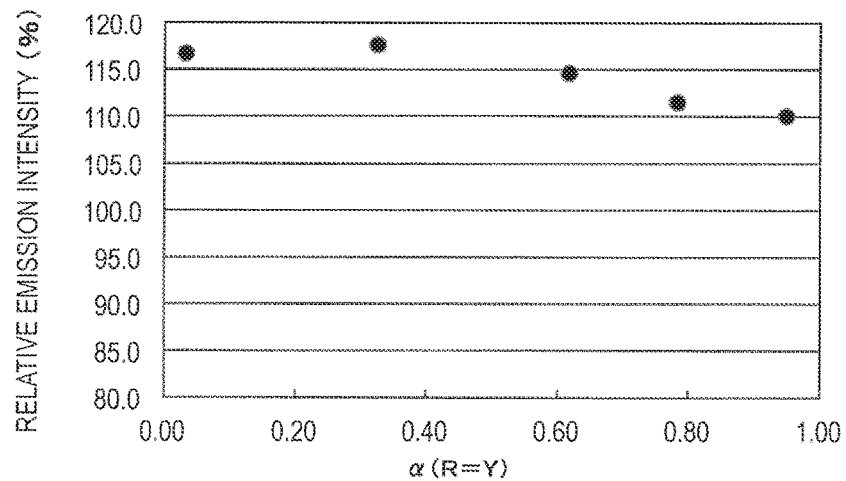
FIG. 3A Shows the relationship between the Y content α as R element and the relative emission intensity.
Figure 3B:
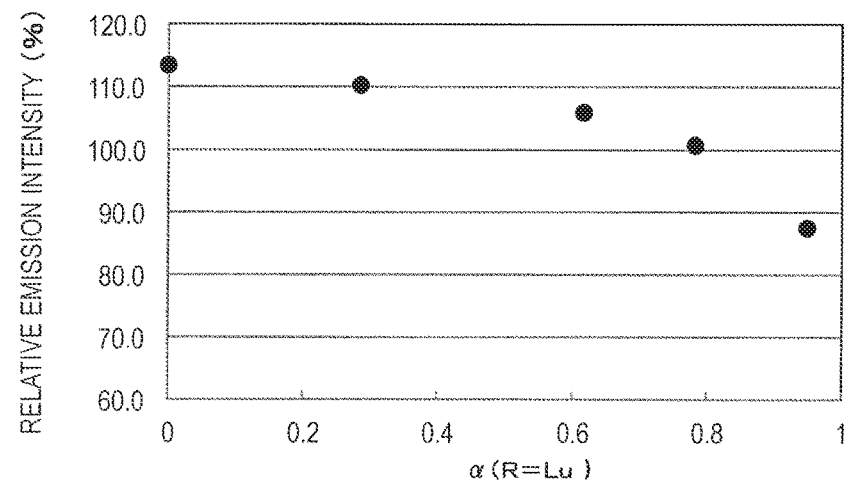
FIG. 3B Shows the relationship between the Lu content α as R element and the relative emission intensity.

The relationship between the Y amount and the relative emission intensity is shown in FIG. 3A. The relationship between the Lu amount and the relative emission intensity is shown in FIG. 3B.

TABLE 4

Composition (atomic ratio) of
$(Gd_{1-\alpha-\beta-\gamma}R_\alpha Ce_\beta Tb_\gamma)_{3+a}(Al_{1-u-v}Ga_u Sc_v)_{5-b}O_{12}$

| a, b | α(R) | β(Ce) | γ(Tb) | u(Ga) | v(Sc) |
|---|---|---|---|---|---|
| 0.01 | 0~0.949 | 0.003/3.01 | 0.15/3.01 | 1.96/4.99 | 0.03/4.99 |

When R is Y, a relative emission intensity of 110% or more is achieved for values of α in the range of $0 \leq \alpha \leq 0.949$. On the other hand, when R is Lu, a relative emission intensity of 100% or more is achieved for values of α in the range of $0 \leq \alpha \leq 0.8$.

Figure 3C:
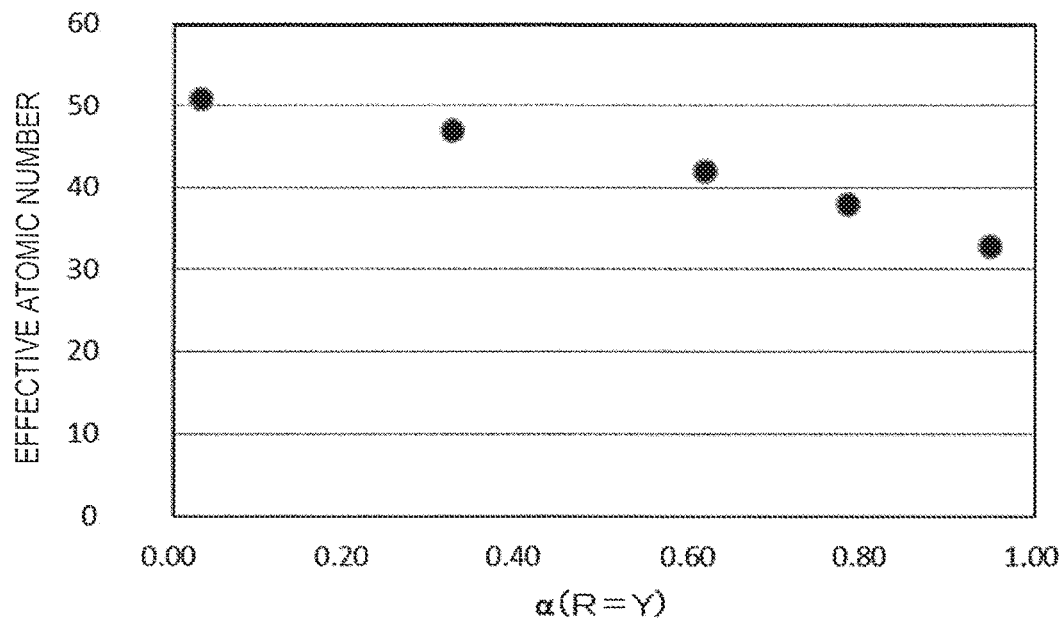
FIG. 3C Shows the relationship between the Y content α as R element and the effective atomic number.
Figure 3D:
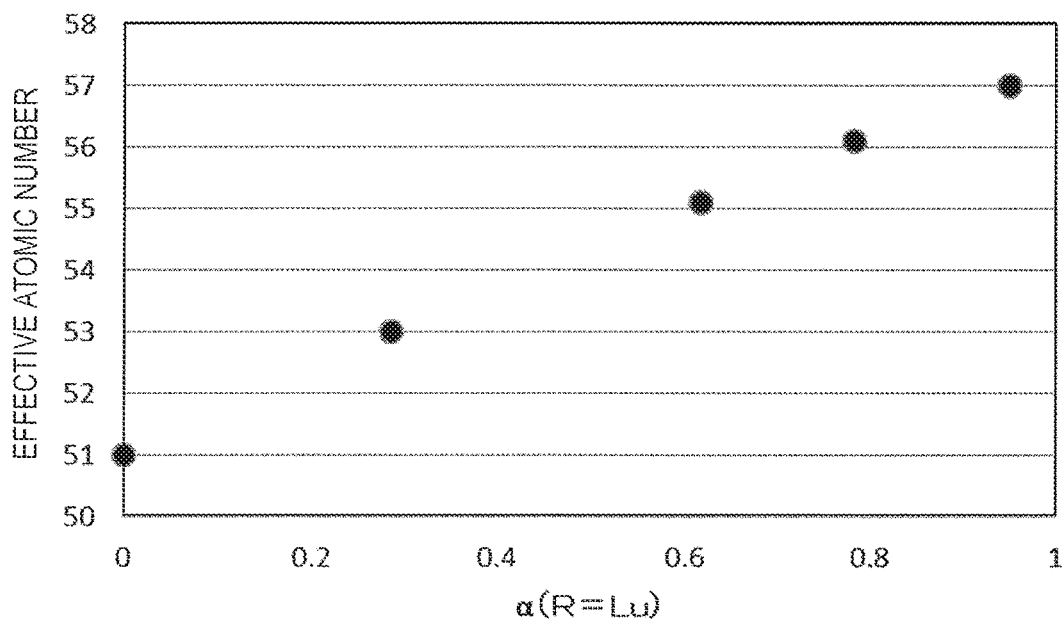
FIG. 3D Shows the relationship between the Lu content α as R element and the effective atomic number.

Table 5 shows the relationship between the R content (Y or Lu) α and the effective atomic number, the energy absorption coefficient and the relative density. FIG. 3C and FIG. 3D respectively show the relationship between the Y amount and the Lu amount and the effective atomic number.

TABLE 5

| R | α | Effective atomic number | Energy absorption coefficient (m$^{-1}$) | Relative density | Relative emission intensity (%) |
|---|---|---|---|---|---|
| Y | 0.033 | 50.7 | 20.7 | 100.1 | 116 |
|   | 0.325 | 46.9 | 15.2 | 100.1 | 117 |
|   | 0.617 | 41.9 | 9.8 | 101.7 | 114 |
|   | 0.783 | 38.0 | 7.2 | 101.2 | 111 |
|   | 0.949 | 32.8 | 4.5 | 102.2 | 77 |
| Lu | 0 | 51.0 | 20.7 | 101.1 | 113 |
|   | 0.285 | 53.0 | 24.4 | 100.2 | 110 |
|   | 0.617 | 55.2 | 25.8 | 101.9 | 105 |
|   | 0.783 | 56.1 | 27.3 | 102.3 | 101 |
|   | 0.949 | 57.0 | 28.9 | 102.5 | 88 |

When R is Y, since the atomic number of Y is smaller than that of Gd, the effective atomic number decreases as α increases. The energy absorption coefficient also decreases as α increases. When α is greater than 0.8, the effective atomic number is smaller than 35 and the energy absorption coefficient is smaller than 7. As a result, the material is less likely to absorb X-rays, and fluorescent light is less likely to occur. Therefore, α is preferably in the range of $0 \leq \alpha \leq 0.8$. It can be seen from FIG. 3C that by setting α in the range of $0.5 < \alpha \leq 0.8$, the effective atomic number can be adjusted to about 37 or more and 45 or less. Note that the effective atomic number is not determined based only on R and α, but is also dependent on the composition ratio of elements other than R in General Formula (1).

When R is Lu, since the atomic number of Lu is greater than that of Gd, the effective atomic number increases as α increases. The energy absorption coefficient also increases as α increases. When α is greater than 0.8, the sintering temperature increases, and it becomes difficult to obtain a sintering block of a sufficient density and the relative emission intensity also decreases. As can be seen from FIG. 3D, it is preferred that the effective atomic number is 53 or more and 57 or less by setting α in the range of $0.3 < \alpha \leq 0.8$, and it is more preferred that $0.5 < \alpha \leq 0.8$ and the effective atomic number is 54 or more and 56 or less.

As described above, by selecting either Y or Lu as R, it is possible to vary the effective atomic number and the energy absorption coefficient with respect to the amount of addition of R, despite the same crystalline structure. Therefore, based on the element to be used as R and on the value of α, it is possible to realize fluorescent materials having various effective atomic numbers and energy absorption coefficients while being substantially equal to one another in properties such as machinability.

Example 3

The relationship between the Ga content and the relative emission intensity was studied. Gadolinium oxide, yttrium oxide, terbium oxide, cerium nitrate, aluminum oxide, gallium oxide and scandium oxide were weighed to the composition formula shown in Table 6. In this process, the Ga content u was set to 0.232, 0.293, 0.333, 0.373, 0.413, 0.453, 0.493, 0.573, 0.593, 0.693, 0.754 and 0.794 in the composition formula below. These material powders were put in a resin pot and subjected to wet ball milling using alumina balls for 40 hours, thus producing a material slurry. The produced slurry was dried and then pressed into a flat plate shape, which was sintered in oxygen. Sintering was done by holding the material at 1660° C. for 12 hours. The resultant fluorescent material was subjected to an ICP-AES analysis to identify the composition thereof, and it was confirmed to be a fluorescent material of the composition shown in Table 6. Using the composition of Table 6, the effective atomic number was calculated to be 49.8 to 51.2. The sintering temperature was so determined that the relative density would be 99% or more, and the relative density of the actual fluorescent material obtained was 99% or more. The average crystal grain size was about 3 μm.

Figure 4:
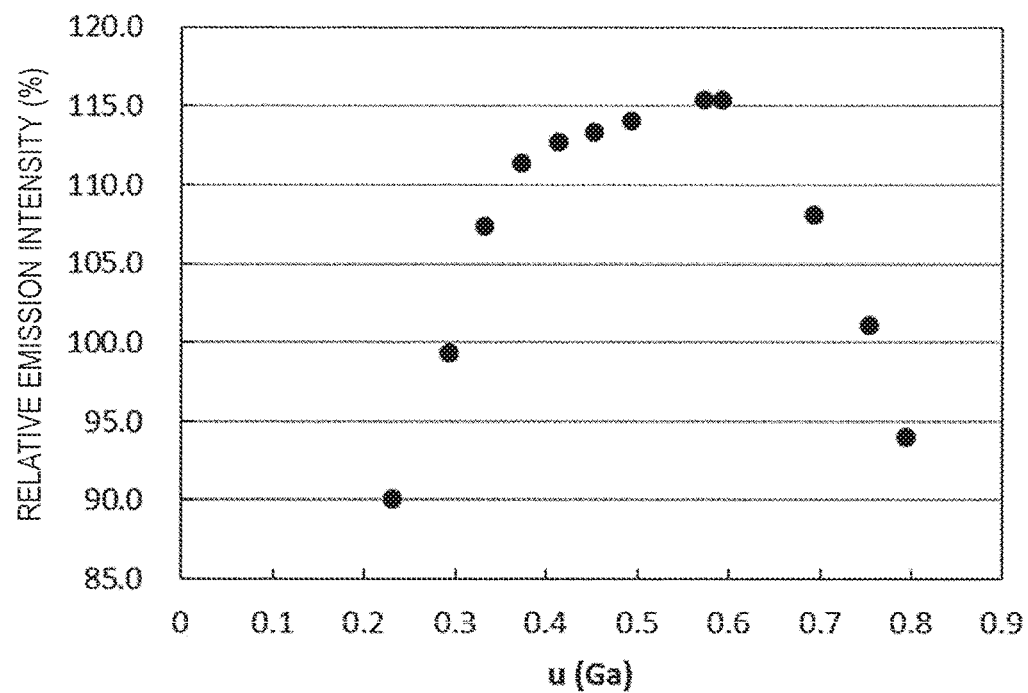
FIG. 4 Shows the relationship between the Ga content u and the relative emission intensity.

The relationship between the Ga content and the relative emission intensity is shown in FIG. 4.

TABLE 6

Composition (atomic ratio) of
$(Gd_{1-\alpha-\beta-\gamma}R_\alpha Ce_\beta Tb_\gamma)_{3+a}(Al_{1-u-v}Ga_u Sc_v)_{5-b}O_{12}$

| a, b | α(Y) | β(Ce) | γ(Tb) | u(Ga) | v(Sc) |
|---|---|---|---|---|---|
| 0.01 | 0.033 | 0.001 | 0.05 | 0.232~0.794 | 0.006 |

As can be seen from FIG. 4, if the value of u representing the Ga content is in the range of $0.27 \leq u \leq 0.75$, it is possible to prevent the lowering of the relative emission intensity, and if it is in the range of $0.35 \leq u \leq 0.70$, it is possible to realize a high emission intensity. Particularly, when u satisfies $0.4 \leq u \leq 0.6$, it is possible to realize an even higher emission intensity.

Example 4

For the composition of $(Gd_{1-\alpha-\beta-\gamma}Y_\alpha Ce_\beta Tb_\gamma)_{3+a}(Al_{1-u-v}Ga_u Sc_v)_{5-b}O_{12}$, the relationship between the values of a and b and the relative emission intensity was studied. Note that a and b were of the same value. Gadolinium oxide, yttrium oxide, terbium oxide, cerium nitrate, aluminum oxide, gallium oxide and scandium oxide were weighed to the composition formula shown in Table 7. In this process, a and b were set to −0.01, 0, 0.01, 0.02, 0.05, 0.1, 0.15 and 0.20 in the composition formula below. These material powders were put in a resin pot and subjected to wet ball milling using alumina balls for 40 hours, thus producing a material slurry. The produced slurry was dried and then pressed into a flat plate shape, which was sintered in oxygen. Sintering was done by holding the material at 1660° C. for 12 hours. The resultant fluorescent material was subjected to an ICP-AES analysis to identify the composition thereof, and it was confirmed to be a fluorescent material of the composition shown in Table 7. Using the composition of Table 7, the effective atomic number was calculated to be 50.7 to 50.8. The sintering temperature was so determined that the relative density would be 99% or more, and the relative density of the actual fluorescent material obtained was 99% or more. The average crystal grain size was about 3 μm.

Figure 5:
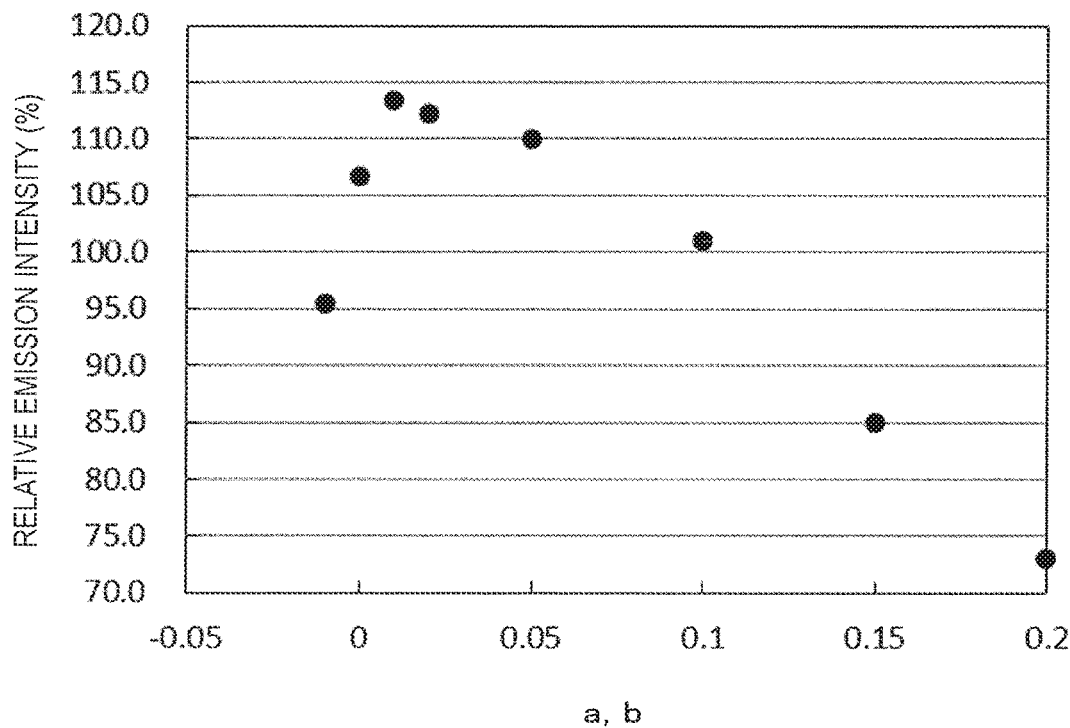
FIG. 5 Shows the relationship between the a content and the b content in the composition $(Gd_{1-\alpha-\beta-\gamma}R_\alpha Ce_\beta Tb_\gamma)_{3+a}(Al_{1-u-v}Ga_u Sc_v)_{5-b}O_{12}$ and the relative emission intensity.

The relationship between the values of a and b and the relative emission intensity is shown in FIG. 5.

TABLE 7

| Composition (atomic ratio) of $(Gd_{1-\alpha-\beta-\gamma}R_\alpha Ce_\beta Tb_\gamma)_{3+a}(Al_{1-u-v}Ga_u Sc_v)_{5-b}O_{12}$ | | | | | |
|---|---|---|---|---|---|
| a, b | α(Y) | β(Ce) | γ(Tb) | u(Ga) | v(Sc) |
| −0.01~0.20 | 0.033 | 0.001 | 0.05 | 0.393 | 0.006 |

As can be seen from FIG. 5, when a<0 and b<0, volids occur at sites of Ce and Tb, which are light-emitting ions, thereby capturing electrons which have been produced by X-ray excitation, thus lowering the emission intensity. When 0≤a and 0≤b, volids are suppressed, exhibiting a desirable emission intensity. On the other hand, when a and b are both greater than 0.1, perovskite-type phase GdAlO$_3$, which is different from the garnet-type phase, is likely to be formed in the scintillator as a different phase. Since the different phase has a refractive index different from that of the garnet-type phase of the base material, light scattering occurs in the perovskite-type phase, lowering the emission intensity. In the range of 0≤a≤0.1 and the range of 0≤b≤0.1, it is possible to prevent the lowering of the relative emission intensity. When 0<a≤0.07 and 0<b≤0.07, it is possible to realize an even higher emission intensity, and when 0.0001≤a≤0.05 and 0.0001≤b≤0.05, it is possible to realize an even higher emission intensity.

Example 5

The relationship between the value of α and the relative emission intensity was studied for a case where Lu was used instead of Y and for a case where Y and Lu were both used.

Gadolinium oxide, yttrium oxide, lutetium oxide, terbium oxide, cerium nitrate, aluminum oxide, gallium oxide and scandium oxide were weighed to the three composition formulas shown in Table 8. These material powders were put in a resin pot and subjected to wet ball milling using alumina balls for 40 hours, thus producing a material slurry. The produced slurry was dried and then pressed into a flat plate shape, which was sintered in oxygen. Sintering was done by holding the material at 1660° C. for 12 hours. The resultant fluorescent material was subjected to an ICP-AES analysis to identify the composition thereof, and it was confirmed to be a fluorescent material of the composition shown in Table 8. Using the composition of Table 8, the effective atomic number was calculated to be 50.7 to 52.5. The sintering temperature was so determined that the relative density would be 99% or more, and the relative density of the actual fluorescent material obtained was 99% or more. The average crystal grain size was about 3 μm. Table 8 also shows the results for a sample using Y obtained in Example 1.

As can be seen from Table 8, it was confirmed that the fluorescent materials of the three different examples realize an emission intensity as high as 95% or more in terms of the relative emission intensity, with Gd$_2$O$_2$S:Tb being 100%, as with fluorescent materials of other examples.

TABLE 8

| Composition (atomic ratio) of $(Gd_{1-\alpha-\beta-\gamma}R_\alpha Ce_\beta Tb_\gamma)_{3+a}(Al_{1-u-v}Ga_u Sc_v)_{5-b}O_{12}$ | | | | | | |
|---|---|---|---|---|---|---|
| a, b | α (Y/Lu) | β (Ce) | γ (Tb) | u (Ga) | v (Sc) | Relative emission intensity (%) |
| 0.01 | 0.033 (0/0.033) | 0.001 | 0.033 | 0.393 | 0.006 | 109 |
| 0.01 | 0.20 (0/0.20) | 0.001 | 0.033 | 0.393 | 0.006 | 103 |
| 0.01 | 0.20 (0.07/0.013) | 0.001 | 0.033 | 0.393 | 0.006 | 96 |
| 0.01 | 0.033 (0.033/0) | 0.001 | 0.033 | 0.393 | 0.006 | 109 |

Example 6

The relationship between the Sc content and the relative emission intensity was studied. Gadolinium oxide, yttrium oxide, terbium oxide, cerium nitrate, aluminum oxide, gallium oxide and scandium oxide were weighed to the composition formula shown in Table 9. In this process, the Sc content v was set to 0, 0.003, 0.006, 0.012, 0.020 and 0.025 in the composition formula below. These material powders were put in a resin pot and subjected to wet ball milling using alumina balls for 40 hours, thus producing a material slurry. The produced slurry was dried and then pressed into a flat plate shape, which was sintered in oxygen. Sintering condition was done by holding the material at 1660° C. for 12 hours. Thus, a fluorescent material was obtained.

The resultant fluorescent material was subjected to an ICP-AES analysis to identify the composition thereof, and it was confirmed to be a fluorescent material of the composition shown in Table 9. Using the composition of Table 9, the effective atomic number was calculated to be 50.7 to 50.8. The sintering temperature was so determined that the relative density would be 99% or more, and the relative density of the actual fluorescent material obtained was 99% or more.

Figure 6:
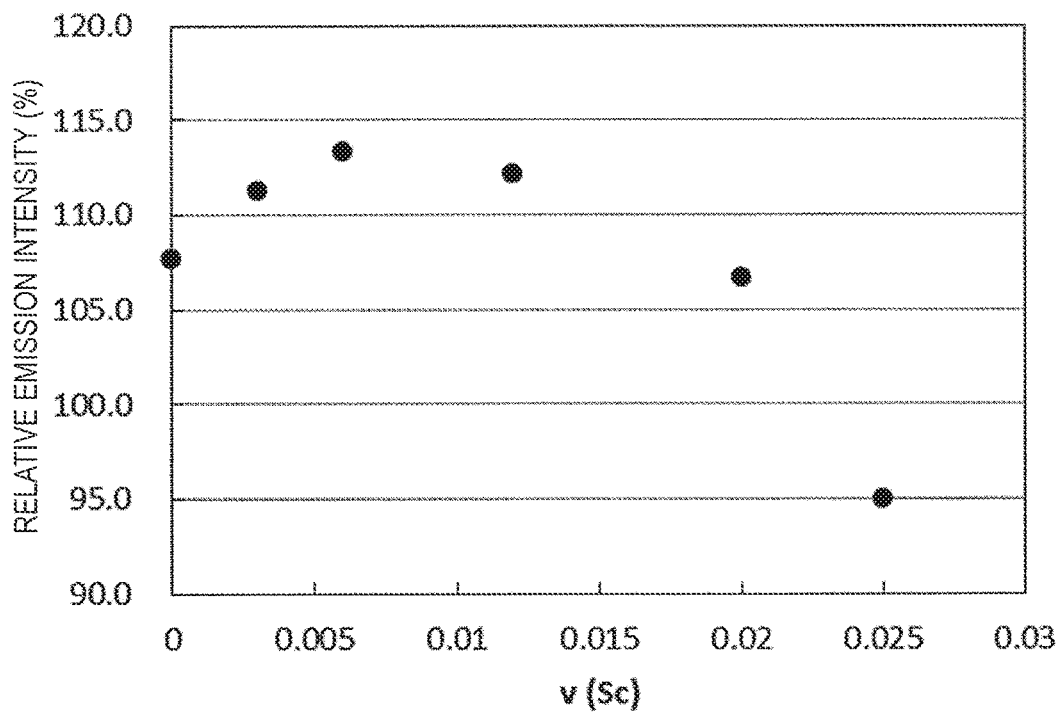
FIG. 6 Shows the relationship between the Sc content v and the relative emission intensity.

The relationship between the Sc content v and the relative emission intensity is shown in FIG. 6.

TABLE 9

| Composition (atomic ratio) of $(Gd_{1-\alpha-\beta-\gamma}R_\alpha Ce_\beta Tb_\gamma)_{3+a}(Al_{1-u-v}Ga_u Sc_v)_{5-b}O_{12}$ | | | | | |
|---|---|---|---|---|---|
| a, b | α(Y) | β(Ce) | γ(Tb) | u(Ga) | v(Sc) |
| 0.01 | 0.033 | 0.001 | 0.05 | 0.393 | 0~0.025 |

Figure 7:
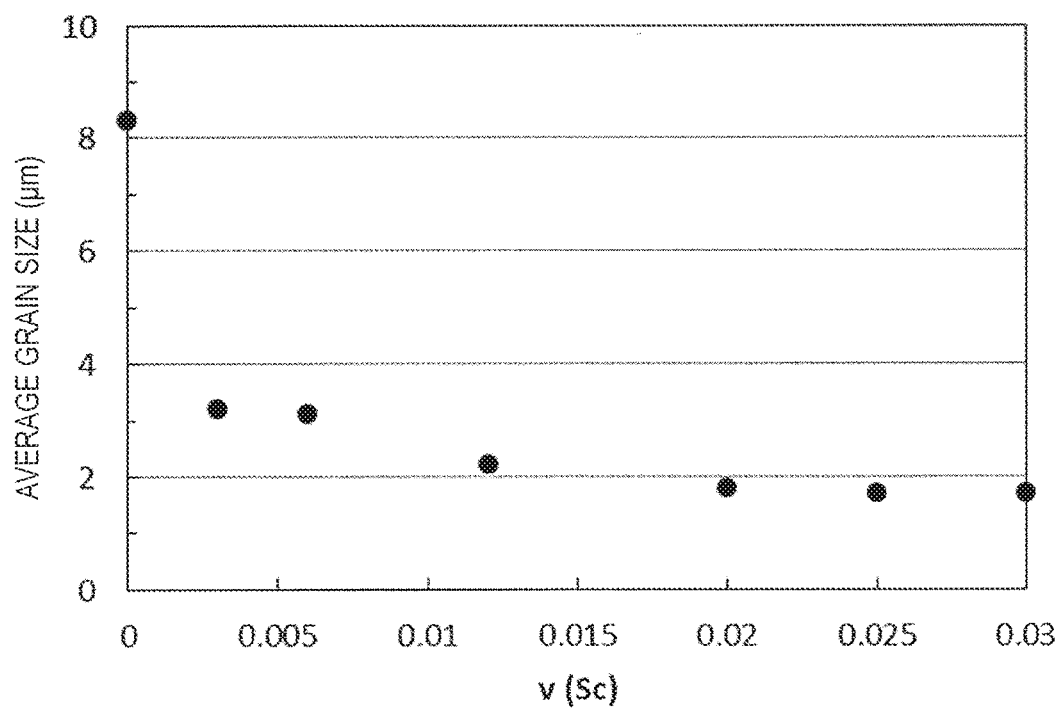
FIG. 7 Shows the relationship between the Sc content v and the average crystal grain size.

The relationship between the Sc content and the average crystal grain size of the fluorescent material was studied. The relationship between the Sc content and the average crystal grain size for the fluorescent material obtained as described above is shown in FIG. 7.

Table 10 shows the result of studying the Sc content and the average crystal grain size and the emission intensity. As can be seen from FIG. 7 and Table 10, it is possible to prevent the lowering of the emission intensity when the value of v representing the Sc content is 0.02 or less. When v is set to 0.003 or more, the crystal grain growth is suppressed, and the average crystal grain size can be made sufficiently small. In view of the fact that the Sc material is expensive and adding it in large amounts will increase the cost and in view of its effect of increasing the emission intensity, the upper limit of v is preferably 0.02 and more preferably 0.015.

TABLE 10

| Samples | v(Sc) | Average crystal grain size (μm) | Relative emission intensity (%) |
|---|---|---|---|
| Example 6-1 | 0 | 8.3 | 99 |
| Example 6-2 | 0.003 | 3.2 | 104 |
| Example 6-3 | 0.006 | 3.1 | 104 |
| Example 6-4 | 0.012 | 2.2 | 103 |
| Example 6-5 | 0.020 | 1.8 | 98 |
| Example 6-6 | 0.025 | 1.7 | 93 |
| Example 6-7 | 0.033 | 1.7 | 92 |

REFERENCE SIGNS LIST 10, 10', 13 Scintillator array
11 First array
10'a, 11a, 12a Incident surface
11c, 10'b, 12c Detection surface
12 Second array
14, 15 Radiation detector
21 First cell
22 Second cell
23 Resin layer
31, 32, 33 Photoelectric conversion element array
31a, 32a, 33a Light-receiving surface

The invention claimed is:

1. A scintillator comprising a fluorescent material that has a composition represented by $(Gd_{1-\alpha-\beta-\gamma}R_\alpha Ce_\beta Tb_\gamma)_{3+a}(Al_{1-u-v}Ga_u Sc_v)_{5-b}O_{12}$, wherein:
R is at least one of Y and Lu;
a, b, α, β, γ, u and v satisfy ranges below:

$0 \leq a \leq 0.1$, $0 \leq b \leq 0.1$, $0 \leq \alpha \leq 0.8$, $0.0003 \leq \beta \leq 0.005$, $0.02 \leq \gamma \leq 0.2$, $0.27 \leq u \leq 0.75$, $0 \leq v \leq 0.02$;

and $\gamma/\alpha < 1$;

a relative density is 99% or more; and
an effective atomic number is 35 or more and 60 or less.

2. The scintillator according to claim 1, wherein:
R is Y;
a, b and α satisfy ranges below:

$0 < a \leq 0.1$, $0 < b \leq 0.1$, and $0.3 < \alpha \leq 0.8$;

and
the effective atomic number is 35 or more and 50 or less.

3. The scintillator according to claim 1, wherein:
R is Lu;
a, b and α satisfy ranges below:

$0 < a - 0.1$, $0 < b \leq 0.1$, and $0.3 < \alpha \leq 0.8$;

and
the effective atomic number is 53 or more and 57 or less.

4. The scintillator according to claim 1, wherein:
R is Lu;
a, b, β, γ, u and v satisfy values below:

$a = 0.01$, $b = 0.01$, $\beta = 0.003/3.01$, $\gamma = 0.15/3.01$, $u = 1.96/4.99$, and $v = 0.03/4.99$, α satisfies a range below:

$0.5 < \alpha \leq 0.8$;

and
the effective atomic number is 54 or more and 56 or less.

5. The scintillator according to claim 1, wherein:
β satisfies a range below:

$0.0005 \leq \beta \leq 0.003$.

6. The scintillator according to claim 1, wherein:
v satisfies a range below:

$0.003 \leq v \leq 0.02$.

7. The fluorescent material according to claim 1, wherein a and b satisfy a=b.

8. The scintillator according to claim 1, wherein:
the fluorescent material includes a first fluorescent material and a second fluorescent material;
for the first fluorescent material,
R is Y;
a, b and α satisfy ranges below:

$0 < a \leq 0.1$, $0 < b \leq 0.1$, and $0.3 < \alpha \leq 0.8$;

and
the effective atomic number is 35 or more and 50 or less;
for the second fluorescent material,
R is Lu;
a, b and α satisfy ranges below:

$0 < a \leq 0.1$, $0 < b \leq 0.1$, and $0.3 < \alpha \leq 0.8$;

the effective atomic number is 53 or more and 57 or less.

9. A radiation detector comprising:
a scintillator according to claim 1; and
a photoelectric conversion element configured to convert light into an electric signal, a current value or a voltage value.

10. The scintillator according to claim 1, wherein the scintillator absorbs radiation rays and emits fluorescent light.

11. The scintillator according to claim 1, wherein the scintillator absorbs γ-rays or X-rays and emits fluorescent light.

12. A scintillator array comprising:
a plurality of first cells made of a first fluorescent material and arranged in a first direction; and
a plurality of second cells made of a second fluorescent material and arranged in the first direction, wherein:
each first cell is arranged to be adjacent to one of the second cells in a second direction perpendicular to the first direction;
each of the first fluorescent material and the second fluorescent material is a fluorescent material as defined in claim 1; and
the first fluorescent material and the second fluorescent material have different energy absorption coefficients from each other.

13. A radiation detector comprising:
a scintillator array according to claim 12; and
a photoelectric conversion element array having a light-receiving surface and including a plurality of photoelectric conversion elements; and
the photoelectric conversion elements are arranged in the first direction, and each photoelectric conversion element is adjacent to one of the first cells and one of the second cells in a third direction perpendicular to the first direction and the second direction so that the light-receiving surface opposes the one first cell and the one second cell.

* * * * *